United States Patent Office 3,305,530
Patented Feb. 21, 1967

3,305,530
ALDEHYDE POLYMERISATION PROCESS
Charles Kenneth Warren, Welwyn Garden City, England, assignor to Imperial Chemical Industries Limited, a corporation of Great Britain
No Drawing. Filed June 6, 1963, Ser. No. 285,860
Claims priority, application Great Britain, June 12, 1962, 22,523/62
12 Claims. (Cl. 260—67)

The present invention relates to the preparation of polyaldehydes.

Polyaldehydes, and particularly crystalline polyaldehydes, are useful thermoplastic materials, especially for the formation of films and fibres. Polyaldehydes may be prepared by the anionic polymerisation of aldehydes, for example in the presence of catalysts such as elemental alkali metals, alkali metal alkyls, cycloalkyls, aryls, alkenyls or hydrides or alkali metal aluminum hydrides, or akali metal alcoholates.

Aldehydes of industrial purity are normally contaminated with the corresponding acids formed by the oxidation of the aldehydes by air (for example industrial n-butyraldehyde generally contains small amounts of n-butyric acid) and the effective removal of these acid contaminants is very difficult and can be costly. These acid contaminants tend to react preferentially with the catalysts recited above in the polymerisation of the aldehydes and inhibit the polymerisation reaction.

I have now discovered a class of compounds that will satisfactorily catalyse the polymerisation of aldehydes in the presence of acid contamination.

According to the present invention I provide a process for the preparation of a polymeric aldehyde in which at least one aldehyde is polymerised in the presence of an organo-metallic compound as catalyst at a temperature below that at which organo-metallic compound would also act as a catalyst for the degradation of the polymer so formed and the organo-metallic compound is thereafter rendered ineffective as a catalyst for the degradation of the polymer and in which the organo-metallic compound contains a metal atom linked to an alkoxy radical of the structure:

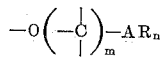

where $m$ is a positive integer, A is nitrogen, phosphorus or sulphur, R is a monovalent hydrocarbon radical or hydrogen, $n$ is a positive integer equal to one less than the valency of A and the free bonds of each carbon atom are satisfied by hydrogen atoms, monovalent hydrocarbon radicals or radicals of the structure $AR_n$, at least one bond of each carbon atom being satisfied by a hydrogen atom or monovalent hydrocarbon radical.

Suitable aldehydes that may be polymerised by the process of the invention are aliphatic aldehydes, cycloaliphatic aldehydes, aromatic aldehydes and substituted derivatives of these aldehydes. The preferred aldehydes are those containing up to 10 carbon atoms. Examples are formaldehyde, acetaldehyde, propionaldehyde, n-butyraldehyde, n-valeraldehyde, iso-valeraldehyde, n-caproaldehyde, cyclohexaldehyde, 2-ethyl-hexaldehyde, benzaldehyde and phenyl acetaldehyde.

Suitable temperatures of polymerisation, at which the chosen catalyst will not also act to catalyse the degradation of the polymer so formed, will vary with the choice of monomer. For example formaldehyde may be polymerised at room temperature or up to about 50° C. in comparative safety while acetaldehyde should be polymerised below —30° C., in order to prevent degradation occurring. In most cases we prefer to use temperatures below —60° C. in order to obtain polymers of useful molecular weight. However, I prefer not to use temperatures below —110° C. as the rate of polymerisation then tends to become uneconomically slow. It is preferred to effect the polymerisation in an inert atmosphere, e.g. of nitrogen gas, and it is particularly preferred to effect it in the absence or substantial absence of air and moisture as these tend to inhibit the polymerisation.

By organo-metallic compounds, we means compounds in which a metal atom is directly linked to at least one monovalent hydrocarbon or oxyhydrocarbon radical or to a substituted (e.g. halogenated) derivative of such a hydrocarbon or oxyhydrocarbon radical (including our specified class of alkoxy radicals).

Examples of metals which may be used in the catalysts of my process are the alkali metals, the alkaline earth metals, boron, aluminium, germanium, tin and lead. Where the metal is polyvalent, all the valencies may be satisfied by my specified alkoxy radicals or some of the valencies may be satisfied by other organic radicals or by halogen or hydrogen atoms.

In the process of my invention I prefer to use catalysts having my specified alkoxy radicals in which A is nitrogen. Such radicals are called amino-alkoxy radicals and in these radicals $n$ will equal 2. I particularly prefer to use the alkali metal amino alkoxides because of the very good results obtained when using them.

Monovalent hydrocarbon groups which may be attached to the non-metallic atom A include alkyl groups, cycloalkyl groups, aryl groups, alkaryl and aralkyl groups. Examples are methyl, ethyl, propyl, isopropyl, isomeric butyl, cyclohexyl, phenyl, benzyl and tolyl groups.

The catalysts used in the process of the present invention are particularly useful since they are soluble in a number of common organic solvents, particularly aromatic hydrocarbons such as benzene and toluene and they may therefore be handled more easily than most metal alkoxides which are in general insoluble or only slightly soluble in the more common solvents.

My specified organo-metallic catalysts activate the polymerisation of aldehydes even in the presence of acid contaminants and this is believed to be due to the co-ordination of the non-metallic atom A in the alkoxy radical (i.e. nitrogen, phosphorus or sulphur) with the metal atom, thus forming a ring compound and reducing the rate of reaction of the compound with the acid at the low temperatures used for polymerisation. Since five-membered rings are known for their stability, I prefer to use those catalysts in which $m=2$, i.e. in which the structure of the alkoxy radical is

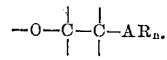

On the whole I prefer $m$ not to exceed 3.

Particularly suitable catalysts are the alkali metal amino-alkoxides (such as sodium N,N-diethyl-2-amino ethoxide, sodium N,N-dimethyl-3-amino n-propoxide and the like), especially the 2-amino-alkoxides. Other catalysts are formed, for example, by reacting one mole of an N-substituted amide with one mole of a hydride or hydrocarbon derivative of a metal. Examples are the products of reacting dimethyl formamide or teteramethyl urea with an aluminium trialkyl such as aluminium triethyl.

The amount of catalyst used in my process is determined partly by the amount of acid contamination of the aldehyde to be polymerised. I have found that if the acid is present in the polymerisation medium in amounts in excess of 3 moles per mole of catalyst, the yield of polymer may suffer and if the acid is present in amounts in excess of about 5 moles per mole of catalyst, only small amounts of polymer may be produced. Thus, where it is desired to polymerise aldehydes of industrial purity, (i.e., containing, in general, up to about 2 mole percent of acid contaminant), we prefer to use from 0.01 to 2 moles of catalyst per 100 moles of aldehyde to be polymerised; from 0.05 to 0.5 mole being particularly preferred. However, where the aldehyde contains excessive amounts of acid contaminant it is preferable either to use larger amounts of catalyst or to purify the aldehyde.

Where it is desired to use a solvent in the process of the invention, it is preferred to use an inert organic compound which is liquid at the temperature of polymerisation. The solvent may be an alkene, alkane or dialkyl ether. Preferred solvents are the lower alkanes and alkenes having from 2 to 7 carbon atoms per molecule, e.g., ethylene, propylene, n-butylene, isobutylene, pentane, n-hexane and n-heptane.

While sub- or super-atmospheric pressures may be used if desired, it is preferred to carry out the polymerisation at atmospheric pressure.

The organo-metallic compounds used in the process of the invention may act as catalysts for the degradation of the polymeric product as well as catalysts for the polymerisation reaction and it is therefore necessary to render the catalyst ineffective after the polymerisation. This may be done, for example, by separating the catalyst from the polymer directly after the end of the polymerisation, for example by adding excess of a selective solvent for the catalyst to the polymerisation medium at the end of the reaction, whereby the soluble catalyst will be separated out from the insoluble polymer.

By a selective solvent for the catalyst, I mean a liquid which is a solvent for the catalyst but a non-solvent for the polymer. Suitable selective solvents are alcohols such as methanol, ethanol or n-butanol and ketones such as acetone. However in the case where my specified catalysts are derived from an alkali metal, solvent extraction is in general insufficient since the action of e.g., an alcohol merely causes the formation of the alkali metal alcoholate which is an equally effective catalyst for the degradation of the polymer at elevated temperatures. I have found that where my catalyst is an alkali metal compound it may be rendered ineffective as a polymer degradation catalyst at elevated temperatures by adding a weak acid to the polymerisation medium in an amount at least equivalent to the amount of catalyst present before the medium is allowed to attain a temperature at which substantial degradation would occur.

It may be that there is sufficient acid already present in the polymerisation medium (as a contaminant of the aldehyde) to deactivate the catalyst effectively at the higher temperatures without additional acid being added. If there is insufficient acid present as contaminant, however, then the required amount of additional acid should be added and this may be done after, during or before the polymerisation as the efficiency of the specified alkali metal alkoxides as polymerisation catalysts under the conditions of polymerisation is not substantially affected by the presence of moderate quantities of acid during the polymerisation, as stated hereinbefore.

In a polymerisation according to the invention, an alkane solvent is cooled to the desired polymerisation temperature, generally of the order of −60° C., or below, under an atmosphere of an inert gas such as nitrogen. To the cooled solvent is added the aldehyde, preferably in the proportion of at least one part of aldehyde to ten parts of solvent, and then the catalyst. The contents are stirred during the polymerisation and on completion of the reaction the catalyst is rendered inactive either by separating it from the polymer or by destroying it. The polymer is filtered, washed and dried.

The products are polyaldehydes having a chain structure of alternate oxygen and carbon atoms. The polymers as formed are generally terminated at one or both ends by hydroxyl groups and the presence of these groups causes a certain amount of undesirable thermal instability in the polymers. This may be reduced to a large extent by reacting the polymer with compounds which will replace the terminal hydroxy groups with other more stable groups. For example, the polymer may be reacted with a carboxylic acid anhydride, preferably in the presence of a tertiary amine, in which case the product is a polymer with carboxylate end groups. The carboxylated polymers derived from certain aldehydes may thereafter be subjected to a heat treatment in accordance with the co-pending application No. 8,157/62 in order to increase their thermal stability still further. Alternatively the polymer may be reacted with an orthoester in the presence of a Lewis acid catalyst, generally boron trifluoride, so as to form the ether-ended polymer.

The high molecular weight polyaldehydes formed by the process of this invention are useful as plastic materials for the manufacture of various shaped articles such as films, sheets, fibres, filaments and other shaped articles. The polymer may be modified by the addition of heat and light stabilisers, pigments, fillers, plasticisers and it may also be blended, if desired, with other polymeric materials.

The invention is illustrated by the following examples in which all parts are expressed as parts by weight except where otherwise indicated.

EXAMPLE 1

*Catalyst preparation*

Two parts of sodium in the form of freshly cut lumps were added to 40 parts of N,N-diethyl-2-aminoethanol under an atmosphere of dry nitrogen. After the initial reaction had subsided the mixture was slowly brought to reflux temperature and when all the sodium had dissolved the resultant solution was cooled and evaporated to dryness under reduced pressure. A gummy residue was obtained and this was kept at 140° C. and 0.1 mm. Hg pressure for two hours to give sodium N,N-diethyl-2-amino ethoxide as a partially crystalline buff solid.

*Polymerisation*

8.2 parts of n-butyraldehyde containing 0.13 part of n-butyric acid contaminant, 6.3 parts of pentane and 0.07 part of sodium N,N-diethyl-2-amino ethoxide (i.e. about 3 moles of acid per mole of catalyst) were kept at −78° C. under an atmosphere of dry nitrogen for 18 hours, by which time the mixture had completely solidified. Twenty parts of acetone were then added and the whole was allowed to warm to room temperature when the solids content was separated, washed with acetone and dried for two days at 25° C. and 15 mm. Hg pressure to give 6.3 parts of poly-n-butyraldehyde as a white solid.

By way of comparison the polymerisation was repeated using 0.1 part of sodium cyclohexoxide as catalyst in place of the amino-alkoxide. Polymerisation conditions were maintained for 19 hours but little indication of polymerisation was observed. The yield was 0.4 part of a discoloured solid.

A further attempt was made to polymerise n-butyraldehyde with an equi-molar mixture of sodium ethoxide and triethylamine but no polymerisation was observed.

EXAMPLE 2

The polymerisation of Example 1 using sodium N,N-diethyl-2-amino-ethoxide was repeated using n-butyraldehyde containing 0.022 part of n-butyric acid contaminant (i.e. one mole of acid per two moles of catalyst). The mixture completely solidified in 15 minutes and the polymerisation was allowed to continue for 18 hours. At the end of this period 20 parts of acetone were added and the whole mixture allowed to warm to room temperature. The solid material dissolved completely and could not be recovered from the solution.

This was because there was insufficient acid in the mixture to destroy the catalyst after the completion of the polymerisation reaction. The fact was confirmed by repeating the polymerisation and adding 0.1 part of n-butyric acid (equivalents to 2.25 moles of acid per mole of catalyst) at the end of the reaction before allowing the mixture to warm. After allowing the mixture to warm to room temperature, the solid material was separated, washed with acetone and dried at 25° C. and 15 mm. Hg pressure for two days to give 3.9 parts of poly(n-butyraldehyde) as a white powder.

EXAMPLE 3

The effect of the presence of acid contamination on the yield of polymer may be shown from the following experiments in which a number of polymerisations of n-butyraldehyde were effected by the process of Example 1. In each polymerisation, the amount of acid contamination (as n-butyric acid) in the monomer and the yield of polymer from the polymerisation (after washing with acetone, warming to room temperature and drying) were compared.

| Experiment | A | B | C | D | E | F | G | H | J |
|---|---|---|---|---|---|---|---|---|---|
| n-Butyric acid present (moles/mole of catalyst) | 0.23 | 0.68 | 1.1 | 1.6 | 2.5 | 3.0 | 3.9 | 4.3 | 5.0 |
| Yield (percent of theoretical) | 0 | 0 | 79 | 75 | 79 | 74 | 65 | 29 | 22 |

In the case of Experiments A and B, no polymer was produced although polymerisation occurred because there was insufficient acid present to destroy the catalyst on completion of the polymerisation and on raising the temperature, it catalysed the degradation of the polymer.

In Experiments C to J, the acid is present in excess of the catalyst and destroys it on raising the temperature after polymerisation is complete thus preventing degradation of the polymeric product. In Experiments G, H and J, however, the large amounts of acid impurity present are beginning to affect the efficiency of the organometallic compound as a polymerisation catalyst.

If Experiments A and B are repeated and sufficient acid is added at the end of the polymerisation before warming up the polymerisation medium to render the organo-metallic compound inactive, polymer is obtained in good yield.

EXAMPLE 4

A stirred mixture of 8.2 parts of n-butyraldehyde containing 0.13 part of n-butyric acid contaminant, 6.3 parts of pentane and 0.07 part of sodium N,N-dimethyl-3-amino-n-propoxide (i.e. about 2.5 moles of acid per mole of catalyst) was kept at −78° C. under an atmosphere of nitrogen for 48 hours. At the end of that period 20 parts of acetone were added to the resultant slurry and the whole was allowed to warm to room temperature. The solids content was separated, washed with acetone and dried at 25° C. and 15 mm. Hg pressure for two days to give 0.6 part of poly(n-butyraldehyde) as a white powder.

EXAMPLE 5

1.28 parts of dimethylformamide were added dropwise to a stirred solution of two parts of aluminum triethyl in a mixture of 6.3 parts methyl cyclohexane and 8.7 parts toluene under an atmosphere of dry nitrogen. 0.9 part of the resultant solution was added to a stirred solution of 7.8 parts acetaldehyde (containing 0.02 part of acetic acid) in 32 parts pentane at −78° C. under an atmosphere of dry nitrogen. After 24 hours, 0.08 part butanol was added and the whole was allowed to warm to room temperature when most of the pentane was evaporated off under reduced pressure. Twenty parts of acetone were added to the residue and the solids content was separated, washed with acetone and dried at 25° C. and 15 mm. Hg pressure for two days to give 2.4 parts of crystalline polyacetaldehyde as a slightly rubbery white solid.

EXAMPLE 6

The polymerisation of Example 5 was repeated using 8.2 parts n-butyraldehyde contaminated by 0.013 part of n-butyric acid, 32 parts pentane and 0.9 part of the same catalyst solution. An additional 0.9 part of catalyst solution was added after 24 hours and a further 0.9 part after 48 hours. Polymerisation was effected for 120 hours. After separation and washing, 2.4 parts of poly-(n-butyraldehyde) were obtained as a white, slightly rubbery, solid.

EXAMPLE 7

A solution of ten parts of tetramethyl urea in 21.7 parts toluene was added dropwise to a stirred solution of ten parts aluminium triethyl in 31.5 parts of methyl cyclohexane and 21.7 parts toluene under an atmosphere of dry nitrogen. 0.95 part of the resulting solution was added to 7.8 parts of stirred acetaldehyde (containing 0.02 part of acetic acid) at −78° C. under an atmosphere of dry nitrogen. After 24 hours 0.8 part n-butanol and 20 parts of acetone were added to the resultant gel and the whole was allowed to warm to room temperature. The solids content was separated, washed with acetone and dried at 25° C. and 15 mm. Hg pressure for two days to give 2.8 parts of polyacetaldehyde as a white, slightly rubbery, solid.

I claim:
1. A process for the preparation of a polymeric aldehyde which comprises polymerising at least one aldehyde selected from the class consisting of aliphatic aldehydes, cycloaliphatic aldehydes, aromatic aldehydes and substituted derivatives of these aldehydes containing altogether not more than 10 carbon atoms, said aldehyde being contaminated with acid, in the presence of an organometallic compound as catalyst at a temperature below that at which the organo-metallic compound acts as a catalyst for the degradation of the polymer so formed and thereafter rendering the organo-metallic compound ineffective as a catalyst for the degradation of the polymer, said organo-metallic compound containing a metal atom selected from the class consisting of atoms of the alkali metals, the alkaline earth metals, boron, aluminium, germanium, tin and lead linked to an alkoxy radical of the structure

wherein $m$ is an integer in the range 2–3 inclusive, A is selected from the group consisting of nitrogen, phosphorus and sulfur, R is selected from the group consisting of alkyl, cycloalkyl, aryl, alkaryl, aralkyl and hydrogen, R′ is selected from the class consisting of radicals of the formula $AR_n$, alkyl, cycloalkyl, aryl, alkaryl, aralkyl and hydrogen, R″ is selected from the class consisting of alkyl, cycloalkyl, aryl, alkaryl, aralkyl and hydrogen and $n$ is a positive integer equal to one less than the valency of A, any valencies on said metal atom not satisfied by said alkoxy radicals being satisfied by a member selected from the group consisting of monovalent hydrocarbon, halogen-substituted monovalent hydrocarbon, halogen and hydrogen.

2. A process according to claim 1 in which A is nitrogen.

3. A process according to claim 1 in which $m$ is equal to 2.

4. A process according to claim 1 in which the catalyst is present in an amount of from 0.05 to 0.5 mole per 100 moles of aldehyde.

5. A process according to claim 1 in which the metal atom is an alkali metal atom.

6. A process according to claim 5 in which the organometallic compound is rendered ineffective as a catalyst for the degradation of the polymer by the presence of a weak acid in an amount at least equivalent to the catalyst present.

7. A process according to claim 1 wherein the catalyst is an alkali metal amino-alkoxide.

8. A process according to claim 7 wherein the catalyst is sodium N,N-dialkyl-2-amino-alkoxide.

9. A process according to claim 1 wherein the aldehyde includes up to about 2 mole percent of acid contaminant and from 0.01 to 2 moles of catalyst is used per 100 moles of aldehyde.

10. A process according to claim 1 wherein the polymerisation temperature is in the range of −60° C. to −100° C.

11. A process according to claim 1 wherein the aldehyde is aded to an inert alkane solvent at the polymerisation temperature and the catalyst is then added to the resulting mixture.

12. A process according to claim 11 wherein the polymerisation temperature is between −60° C. and −100° C., polymerisation is carried out in the presence of an inert atmosphere, the catalyst is an alkali metal aminoalkoxide and after polymerisation, the catalyst is rendered ineffective by increasing the temperature of the polymerisation mass in the presence of a weak acid in an amount at least equivalent to the catalyst present.

References Cited by the Examiner

UNITED STATES PATENTS

| | | | |
|---|---|---|---|
| 2,971,988 | 2/1961 | Hill et al. | 260—2 |
| 3,017,389 | 1/1962 | Langsdorf et al. | 260—67 |

FOREIGN PATENTS

| | | |
|---|---|---|
| 222,884 | 8/1962 | Austria. |
| 527,227 | 7/1956 | Canada. |
| 827,472 | 2/1960 | Britain. |
| 870,775 | 6/1961 | Britain. |
| 912,405 | 2/1961 | Britain. |
| 1,268,191 | 6/1961 | France. |

OTHER REFERENCES

Russian Chemical Reviews, vol. 31, No. 4, April 1962, pp. 225–35.

SAMUEL H. BLECH, *Primary Examiner.*

LOUISE P. QUAST, WILLIAM H. SHORT, *Examiners.*

L. M. MILLER, *Assistant Examiner.*